Oct. 25, 1966  F. M. HATCHER  3,280,796
FOLDING DOG HOUSE
Filed June 7, 1965

FRANK M. HATCHER
INVENTOR.

BY

ATTORNEY

United States Patent Office 3,280,796
Patented Oct. 25, 1966

3,280,796
FOLDING DOG HOUSE
Frank M. Hatcher, 800 5th Ave., Fort Worth, Tex.
Filed June 7, 1965, Ser. No. 461,868
1 Claim. (Cl. 119—19)

This invention relates to a folding dog house, and it concerns more particularly a foldable box-like structure as hereinafter described which, although intended primarily as a portable dog house, is suitable also for use as a doll house or play house, or as a pet carrier, as in transporting pets by commercial air lines.

An object of the invention is to provide a foldable box-like structure for use as described which in its erected position provides a sturdy and weather proof shelter for a dog or other pet and which is well adapted to be used in the open, and is strong enough for a large dog or a man to sit on, while at the same time being characterized by its compactness and its light weight in its folded position, and which is convenient as well as efficient in operation and durable in use and is readily identifiable as a quality piece of merchandise, attractive in its appearance.

The invention contemplates a foldable box-like structure for use as described having a pair of oppositely inclined roof panels and having bottom, side, and end panels each consisting of a single piece of comparatively thin but stiff, light weight sheet material such as plywood, said panels being connected one to another by a series of six continuous hinges each substantially coextensive with the adjacent edge of one of two adjoining panels which it connects, whereby said panels may be folded compactly one upon another about said hinges in the folded positions thereof, for convenience in transporting and storing, and latch means whereby said panels are adapted to be further connected one to another, in the erected positions thereof, to form a rigid, fully enclosed unitary structure characterized by its strength.

The invention will be readily understood by referring to the following description and the accompanying drawing, in which.

Figure 1:
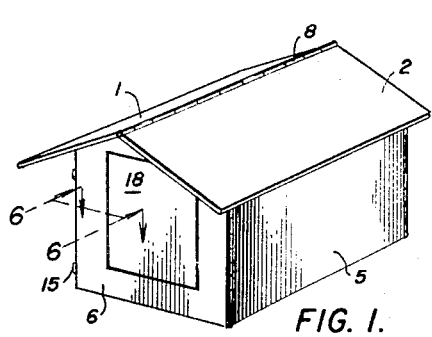
FIG. 1 is a perspective view of a dog house embodying the invention, showing the dog house in its erected position as seen from the top, the front end, and the right side thereof.

Referring to the drawing, the dog house of the invention has a pair of oppositely inclined roof panels 1, 2, and has a bottom panel 3, a pair of side panels 4, 5, and a pair of end panels 6, 7, each of which consists of a single piece of comparatively thin but stiff, light weight sheet material such as plywood.

Figure 5:
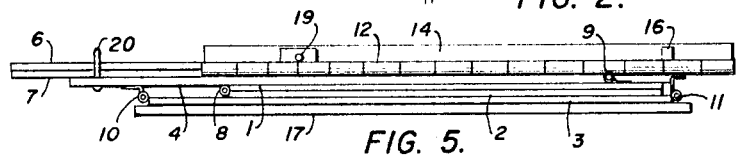
FIG. 5 is an end elevational view of the folded panels as shown in FIG. 4.
Figures 3, 6:
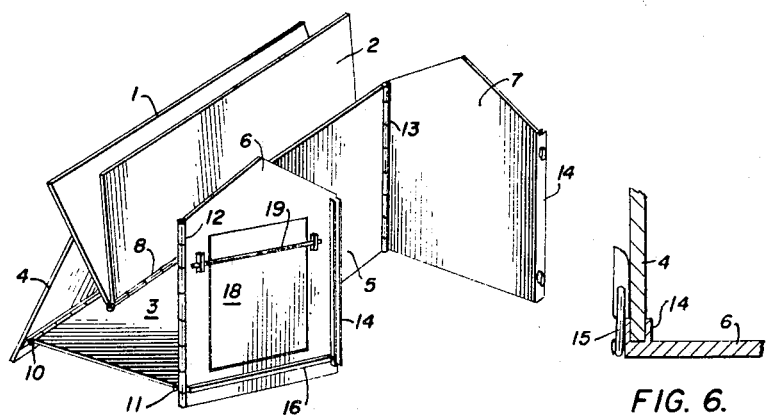
FIG. 3 is a perspective view showing the hinged panels which comprise the dog house in partly folded positions.
FIG. 6 is a fragmentary view on an enlarged scale showing details of construction.
Figure 4:
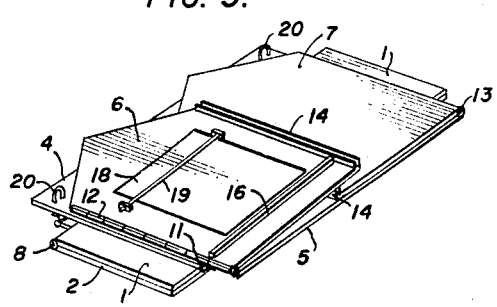
FIG. 4 is a view similar to FIG. 3 showing the hinged panels in their completely folded positions.

As shown best in FIG. 3, the seven panels 1 to 7 are connected one to another by a series of six continuous hinges, numbered 8 to 13, each of which is substantially coextensive with the adjacent edge of one of two adjoining panels which it connects, as hereinafter described, whereby the panels 1 to 7 may be folded compactly one upon another about the hinges 8 to 13 in the folded positions thereof, as shown in FIGS. 4 and 5, for convenience in transporting and storing.

The adjacent edges of the roof panels 1, 2 are connected by a continuous hinge 8 having a length which is substantially coextensive with the length of the roof panels 1, 2 which it connects.

The upper edge of the left side panel 4 is connected to the under side of the left roof panel 1, in spaced apart relation to the lower edge of the roof panel 1, by a continuous hinge 9 having a length substantially coextensive with the length of the side panel 4.

The bottom panel 3 is connected to the left side panel 4, in spaced apart relation to the lower edge of the side panel 4, by a continuous hinge 10 having a length substantially coextensive with the length of the bottom panel 3.

The bottom panel 3 is connected to the right side panel 5, in spaced apart relation to the lower edge of the side panel 5, by a continuous hinge 11 having a length substantially coextensive with the length of the bottom panel 3.

The two opposite ends of the right side panel 5 are connected to the adjacent edges of the end panels 6, 7 by continuous hinges 12, 13 having lengths substantially coextensive with the height of the side panel 5.

Figure 2:
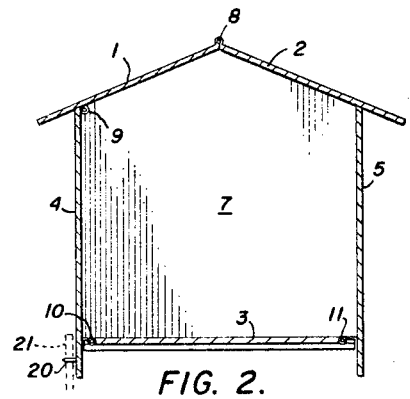
FIG. 2 is a transverse sectional elevational view showing the dog house as shown in FIG. 1 with the front end thereof removed.

As shown in FIG. 6, the two opposite ends of the left side panel 4, which adjoin the end panels 6, 7 in the erected positions of said panels, as shown in FIGS. 1 and 2, are received in grooves 14 therefor in the opposing surfaces of the end panels 6, 7 and are secured against displacement therefrom by latch means 15 which may be of any suitable construction.

The upper edge of the right side panel 5 is removably connected to the under side of the right roof panel 2, in spaced apart relation to the lower edge of the roof panel 2, in the erected positions of said panels, as shown in FIGS. 1 and 2, by suitable latch means (not shown).

The end panels 6, 7 are stiffened by a pair of elongated, comparatively narrow, light weight reinforcing members 16, each consisting of a piece of wood, which are attached to the inner surfaces of the end panels 6, 7 immediately above their lower edges and extend horizontally across them in the erected positions of said panels, as shown in FIGS. 1 and 2.

The bottom panel 3 is stiffened by an elongated, comparatively narrow, light weight reinforcing member 17, consisting of a piece of wood, which is attached to the under side of the bottom panel 3 and extends horizontally across it intermediate its ends in the erected position of said panel, as shown in FIGS. 1 and 2.

As shown in FIGS. 1, 3 and 4, the front end panel 6 has a swinging door 18 therein. The door 18 is suspended from the top thereof, as at 19, and is movable pivotally about a horizontal axis.

As shown in FIGS. 2, 4 and 5, a pair of rings 20 are attached to the left side wall 4 near its lower edge, adjacent opposite ends thereof, for engagement by stakes 21, one of which is shown in broken lines in FIG. 2.

An important feature of the invention is that the roof panels 1, 2, which are oppositely inclined and which are connected by the hinge 8, extend longitudinally beyond the end panels 6, 7, the upper edges of which have oppositely inclined portions for engagement with the under side of the roof panels 1, 2, and extend downwardly and laterally outwardly beyond the side panels 4, 5.

Another feature of the invention is that the bottom panel 3, which provides a floor for the dog house of the invention, is spaced above the ground in the erected position thereof, as shown best in FIG. 2, and an enclosed dead air space is provided below the bottom panel 3, within the enclosure formed by the side panels 4, 5 and the end panels 6, 7.

The invention may be modified in various ways without departing from the spirit and scope thereof.

I claim:

A folding dog house comprising a foldable box-like structure having a pair of oppositely inclined roof panels and having bottom, side, and end panels each consisting of a single piece of comparatively thin but stiff, light weight sheet material, said panels being connected one to another by hinges whereby they may be folded compactly one upon another about said hinges in the folded positions thereof, for convenience in transporting and storing, one of said hinges connecting the adjacent edges of the roof panels, another of said hinges connecting the upper edge of one of the side panels to the under side of one of the roof panels, in spaced apart relation to the lower edge thereof, a third hinge connecting the bottom panel to said one of the side panels, in spaced apart relation to the lower edge thereof, a fourth hinge connecting the bottom panel to the side panel opposite said one of the side panels, in spaced apart relation to the lower edge thereof, and two other hinges connecting the two opposite ends of the last mentioned side panel to the adjacent edges of the adjoining end panels, and latch means whereby said panels are adapted to be further connected one to another, in the erected positions thereof, to form a rigid, fully enclosed unitary structure characterized by its strength.

References Cited by the Examiner

UNITED STATES PATENTS

| | | | |
|---|---|---|---|
| 2,258,344 | 10/1941 | Walker | 119—19 |
| 2,445,055 | 7/1948 | Capaul | 119—19 X |
| 2,456,419 | 12/1948 | Jackson et al. | 220—6 |

SAMUEL KOREN, *Primary Examiner.*

H. R. CHAMBLEE, *Examiner.*